(12) United States Patent
Hobbs et al.

(10) Patent No.: US 7,822,278 B1
(45) Date of Patent: Oct. 26, 2010

(54) METHODS AND APPARATUS FOR ENCODING A DIGITAL VIDEO SIGNAL

(75) Inventors: David Victor Hobbs, Surrey (CA); Patrick Ratto, Burnaby (CA); Debra Dorey, legal representative, Burnaby (CA)

(73) Assignee: Teradici Corporation, Burnaby, British Columbia (CA)

( * ) Notice: Subject to any disclaimer, the term of this patent is extended or adjusted under 35 U.S.C. 154(b) by 1069 days.

(21) Appl. No.: 11/532,865

(22) Filed: Sep. 18, 2006

Related U.S. Application Data (63) Continuation-in-part of application No. 11/333,955, filed on Jan. 17, 2006, now Pat. No. 7,747,086.

(60) Provisional application No. 60/719,050, filed on Sep. 20, 2005, provisional application No. 60/726,418, filed on Oct. 12, 2005.

(51) Int. Cl.
*G06K 9/36* (2006.01)
*G06K 9/46* (2006.01)

(52) U.S. Cl. ............................................. 382/232

(58) Field of Classification Search ............ 382/232, 382/233; 375/240.01, E7.264; 348/14.01, 348/14.13, 420; 345/2.1, 3.1, 329; 341/63, 341/65, 106; 709/247, 250; 713/171; 714/E11.173
See application file for complete search history.

(56) References Cited

U.S. PATENT DOCUMENTS

| | | | |
|---|---|---|---|
| 4,984,076 A | 1/1991 | Watanabe et al. | |
| 5,157,491 A | 10/1992 | Kassatly | |
| 5,263,100 A | 11/1993 | Kim et al. | |
| 5,473,366 A * | 12/1995 | Imaeda et al. | 348/14.01 |
| 5,583,573 A | 12/1996 | Asamura et al. | |
| 5,767,978 A | 6/1998 | Revankar et al. | |
| 5,945,933 A * | 8/1999 | Kalkstein | 341/63 |
| 5,990,852 A | 11/1999 | Szamrej | |
| 6,664,969 B1 | 12/2003 | Emerson et al. | |
| 6,701,380 B2 | 3/2004 | Schneider et al. | |
| 6,760,482 B1 | 7/2004 | Taubman | |
| 6,915,027 B2 | 7/2005 | Ali | |
| 7,084,837 B2 * | 8/2006 | Sotoda et al. | 345/3.1 |
| 7,430,219 B2 * | 9/2008 | Itoh et al. | 370/465 |
| 2002/0054044 A1 | 5/2002 | Lu et al. | |
| 2003/0126443 A1 | 7/2003 | Wakao | |
| 2003/0177172 A1 | 9/2003 | Duursma et al. | |
| 2003/0189574 A1 | 10/2003 | Ramsey | |

(Continued)

OTHER PUBLICATIONS

Buck, Ian, Humphreys, Greg, and Hanrahan, Pat, "Tracking Graphics State for Networked Rendering," Proceedings of SIGGRAPH/Eurographics Workshop on Graphics Hardware, Aug. 2000, 9 pages, ACM Press, New York, N.Y. U.S.A.

(Continued)

*Primary Examiner*—Amir Alavi
(74) *Attorney, Agent, or Firm*—Moser IP Law Group (57) ABSTRACT

The invention provides a non-intrusive method and apparatus for encoding a digitized raster display signal which may then be transmitted from a host computer system to a remote display across a communications link. Hash codes are used to detect persistent blocks of pixels in a real-time digital raster signal generated by the host computer. A progressive encoding and transmission sequence is then initiated, using parameters such as bandwidth availability and build quality requirements to determine suitable encoding methods and build levels.

28 Claims, 8 Drawing Sheets

U.S. PATENT DOCUMENTS

| | | | |
|---|---|---|---|
| 2003/0191860 | A1 | 10/2003 | Gadepalli et al. |
| 2003/0212811 | A1 | 11/2003 | Thornton |
| 2004/0008205 | A1 | 1/2004 | O'Neill et al. |
| 2004/0008213 | A1 | 1/2004 | O'Neill et al. |
| 2004/0008214 | A1 | 1/2004 | O'Neill et al. |
| 2004/0010622 | A1 | 1/2004 | O'Neill et al. |
| 2004/0062305 | A1 | 4/2004 | Dambrackas |
| 2005/0025234 | A1* | 2/2005 | Kato et al. ............. 375/240.01 |
| 2005/0166050 | A1* | 7/2005 | Kosaki ...................... 713/171 |
| 2006/0233201 | A1 | 10/2006 | Wiesenthal |
| 2007/0076639 | A1* | 4/2007 | Chou ......................... 370/310 |

OTHER PUBLICATIONS

Humphreys, Greg and Hanrahan, Pat, "A Distributed Graphics System For Large Tiled Displays," Proceedings IEEE Visualization '99, 9 pages, 1999.

Nieh, Jason, Yang, S. Jae, and Novik, Naomi et al., "A Comparison of Thin-Client Computing Architectures," Technical Report CUCS-022-00, Network Computing Laboratory, Columbia University, Nov. 2000, 16 pages.

"OpenGL Vizserver™3.1 Application-Transparent Remote Interactive Visualization and Collaboration", White Paper, Silicon Graphics Inc., 2003, 15 pages.

Stegmaier, Simon, Magallon, Marcelo, and Ertl, Thomas, A Generic Solution for Hardware-Accelerated Remote Visualization, Joint Eurographics—IEEE TCVG Symposium on Visualization, 2002, pp. 87-94, vol. 22, Eurographics Association, Aire-la-Ville, Switzerland.

U.S. Appl. No. 11/137,817, filed Jun. 30, 2005.

U.S. Office Action mailed Apr. 14, 2009 for U.S. Appl. No. 11/333,955, filed Jan. 17, 2006.

Al-Turkistany et al., "Intelligent Adaptation Framework for Wireless Thin-client Environments," Proceedings of the International Conference on Computing, Communications and Control Technologies: CCCT'04, Aug. 2004, 12 pages, Austin, Texas.

Gilbert, Jeffrey Michael, "Text / Graphics and Image Transmission over Bandlimited Lossy Links," A thesis submitted in partial satisfaction of the requirements for the degree of Doctor of Philosophy in Engineering Electrical Engineering and Computer Sciences in the Graduate Division of the University of California, Berkeley, Spring 2000, 276 pages, Berkeley, CA.

Hsu, Hui-Huang et al., "Adaptive Image Transmission by Strategic Decomposition," Proceedings of the 18th International Conference on Advanced Information Networking and Application (AINA'04), 6 pages.

Liu, Zhen et al, "JPEG2000 Encoding With Perceptual Distortion Control," IEEE Transactions on Image Processing, Jul. 2006, vol. 15, No. 7, pp. 1763-1778, IEEE, New York, NY, USA.

Rauschenbach, Uwe et al., "Flexible Embedded Image Communication using Levels of Detail and Regions of Interest," Proceedings IMC '98—Interactive Applications of Mobile Computing in Rostock, Germany, Nov. 24-25, 1998, 10 pages.

Kamath, S. et al., "Low-Bit Rate Motion JPEG Using Differential Encoding," 38th Asilomar Conference on Signals Systems and Computers, Nov. 2004, vol. 2, pp. 1723-1726, IEEE, New York, NY, USA.

Zhao, L. et al., "Constant Quality Rate Control for Streaming MPEG-4-FGS Video." In Proceedings of IEEE International Symposium on Circuits and Systems (ISCAS), 2002, pp. 544-547, IEEE, New York, NY, USA.

US Non-Final Office Action mailed Jun. 4, 2008 for U.S. Appl. No. 11/549,055, filed Oct. 12, 2006.

Liang, Shih Tsung et al., "Design and Modeling of the Generally Adopted Progressive Image Transmission Regulator and its Application", Proceedings of the 2001 International Conference on Image Processing, Oct. 7-10, 2001, vol. 1, pp. 90-93, IEEE, New York, NY, USA.

Raman, Suchitra et al., "ITP: An Image Transport Protocol for the Internet", IEEE/ACM Transactions on Networking, Jun. 2002, vol. 10, No. 3, pp. 297-307,(12 pages), IEEE, New York, NY, USA.

Turner, Charles J. et al., "Image Transfer, An End to End Design", SIGCOMM '92, Proceedings of the Conference on Communications Architecture & Protocols, Aug. 17-20, 1992, pp. 258-268, held in Baltimore, Maryland, USA. ACM Press, USA.

* cited by examiner

METHODS AND APPARATUS FOR ENCODING A DIGITAL VIDEO SIGNAL

RELATED APPLICATIONS

This application is a Continuation-in-Part of U.S. patent application Ser. No. 11/333,955, filed Jan. 17, 2006, now U.S. Pat. No. 7,747,086 entitled "Methods and Apparatus for Encoding a Shared Drawing Memory," incorporated herein by reference in its entirety, this application claims priority to Provisional Patent Application Ser. No. 60/719,050, filed Sep. 20, 2005, entitled "Methods and Apparatus for Using Hash Codes to Enable Progressive Build," incorporated herein by reference in its entirety, and Provisional Patent Application No. 60/726,418, filed Oct. 12, 2005, entitled "Sequenced Progressive Encoding Methods," incorporated herein by reference in its entirety.

FIELD

The invention relates generally to methods for encoding a video signal for communication across a transmission medium. More particularity, the invention relates to a method for identifying and encoding persistent regions of a digital rasterized computer display stream for transmission to a remote user interface across a standard computer network.

BACKGROUND

Historic advances in computer technology have made it economical for individual users to have their own computing system, which caused the proliferation of the Personal Computer (PC). Continued advances of this computer technology have made these personal computers very powerful but also complex and difficult to manage. For this and other reasons, there is a desire in many workplace environments to separate the display from the application processing parts, or data processor of the computing system. In this preferred configuration, the display is physically located at the user's desktop, while the processing and storage components of the computer are placed in a central location. The display is then connected to the data processor and storage components with some method of communication. Applications relating to still image and generic video encoding are highly sophisticated and well published. However, the content and refresh characteristics of a computer display are different to video and still image transmission systems, leading to opportunities for improved encoding methods.

Still images such as photographs may be encoded using transform domain techniques that enable the progressive build of image bit planes at the client end of the network. Progressive image transfer (PIT) is a standard feature of the JPEG2000 specification and enables the early display of a reasonable quality image approximation at the client side of the network by first displaying the low spatial frequency components of the image, followed by a progressive build to a lossless image over a series of build frames. This approach lowers the peak bandwidth requirements for the image transfer compared with sending the whole image in a single frame. However, a fundamental shortcoming is a lack of support for dynamic images. Another shortcoming lies in the lack of encoding support for compound images comprised of text, pictures, background and high definition icon types.

Video transmission methods are tailored to the transmission of highly dynamic images at fixed frame rates and limited bandwidth. They are relatively insensitive to encode/decode delays and typically use encoding methods unrelated to this discussion. Hybrid variations such as M-JPEG transmit a series of independent JPEG images without applying inter-frame prediction methods typical of other video encoding methods such as MPEG-2 or H.264 etc. Consequently, these offer limited compression and tend to consume high network bandwidth in applications that mandate high frame rates. Therefore they remain best suited to specialized applications like broadcast resolution video editing or surveillance systems where the frame rate is low.

A few techniques have been developed specifically to support the transmission of display signals over standard networks. These methods attempt to address the problem of transmitting high bandwidth display signals from the processing components to the remote desktop in various ways. The simplest method is to periodically send copies of frame buffer information from the data processor. This is impractical for sending a normal resolution display image at a reasonable refresh rate. For example, an SXGA image frame of 1280×1024 at 24-bit resolution would take 0.3 seconds of dedicated 100 Base T LAN network bandwidth, making perception-free communications of display information impossible.

An alternative approach is to intercept graphics instructions on the data processor and communicate these across the network. However, this method is intrusive on the host system which requires operating system dependent graphic command routing software. Moreover, a processor and software capable of interpreting the graphics commands is required at the remote user interface which makes the method restrictive in its broad compatibility, adds cost and increase complexity to the remote installation.

In another approach, the data processor compares the previously transferred frame with the current frame and only transfer changes between them. This decreases the overall amount of data, especially for a computer display in which much of the display may be static from frame to frame. However, this approach is expensive to implement because the data processor requires at least two frame buffers namely a first containing a copy of the previously communicated frame and a second containing the present frame. Given that the previous frame must be compared with the present frame one pixel at a time, possibly requiring an additional temporary delta-buffer, this approach is both memory and computationally intensive. There is a noticeable decrease in the performance of applications running on the data processor, especially during applications such as video clips that involve significant screen refresh activity. This is caused by each screen refresh requiring the movement and copying of graphics information between the frame buffers across the local system bus of the data processor.

A variation of the frame comparison method reduces the overall data processor memory requirement by segmenting the frame buffer into tiles and maintaining a list of signatures for the tiles. The new frame is tiled and the signature for each new tile is compared with the signature in the list to determine if the tile should be transferred. These tiling and list methods are limited. They require hardware or application-based frame buffers tightly-coupled with the data processing architecture. System performance is impacted by the copying of pixels and signatures which loads the system bus. Software approaches interrupt the operating system so that background tasks can manage the activity. This further reduces the performance of the data processor. Existing tiled change detect methods are also limited in sophistication. Typically, an operation is only performed when the image has changed, in which case the operation is to send the new image.

In summary, existing still image and video compression techniques are not optimized for the high-quality and low latency encoding requirements of dynamic computer display images. Other methods developed specifically to transfer computer display images require intrusive components or a complex remote display system. This results higher equipment and maintenance costs and lower performance. Therefore, a better method for encoding computer display images that takes advantage of the characteristics of the environment is needed.

SUMMARY

The primary objective of the present invention is to provide non-intrusive methods and apparatus for encoding a digitized raster display signal that may then be transmitted from a host data processing system to a remote display across a communications link. There are a number of aspects to the present invention. In one aspect, the invention detects persistent blocks of pixels in a real-time digital raster signal and uses progressive encoding sequences to transmit and build persistent blocks. This aspect of the invention brings the human perception and bandwidth efficiency benefits of progressive encoding methods used in still image compression to the compression of a dynamic computer display image.

In another aspect, the invention provides a sequencer that selects encoding methods and build sequences based on the current build state and control parameters such as bandwidth availability and other inputs. This aspect enables a dynamic build sequence defined by the state of the current block in a display image, the state of other blocks and external factors such as error states.

In another aspect, the invention provides a selectable quality encoder that enables the number of encoded bit planes for a frame to be dependent on the bandwidth availability at the time. This allows the rapid build of recently updated areas of a computer display in the case where other areas are persistent and optimized bandwidth consumption in the case where large areas of the display are updated. Unlike methods that use pixel by pixel comparisons for detecting persistent images, the invention saves the memory bandwidth required to load previously stored images. One embodiment of the invention enables a progressive build system to operation without a stored image at the encoder which saves both memory and memory bandwidth.

In summary, the invention offers benefits over other computer display encoding methods. Unlike methods that detect image changes in order to transmit the new image to the display, this invention detects persistent image sections, enabling a sequenced build of the image dependent on human perception factors, bandwidth availability and bandwidth consumption preferences. Unlike progressive encoding methods applicable to the building of still images, this method offers an adaptive progressive encoding sequencer with selectable quality levels optimized for the encoding of computer display images.

Many other features and advantages of the present invention will be realized upon reading the following detailed description, when considered in conjunction with the accompanying drawings, in which:

DETAILED DESCRIPTION

Figure 1:
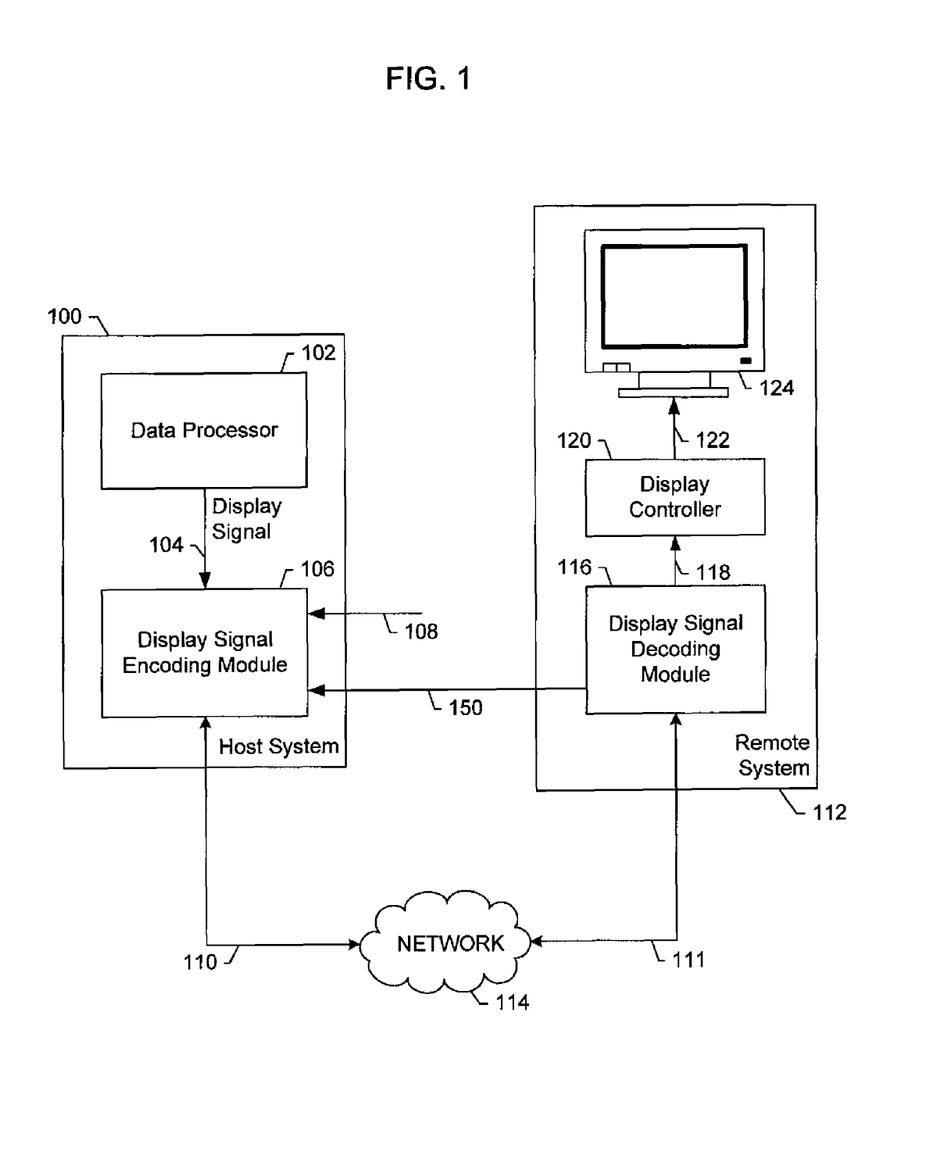
FIG. 1 is a system architecture diagram showing a host computer system with an encoding module connected to a display output and a remote display system with a module for decoding build layers once they have been communicated across a network.

FIG. 1 presents a system architecture of one embodiment of the invention. In the embodiment described, a display signal encoding module enables the transfer of computer display images from a host data processor to a remote display system. However, the invention is also applicable to other media transport systems, for example recording, storage or archival systems.

Referring to FIG. 1, host system 100 has data processor 102 with digital display output signal 104. In the described embodiment, digital display output signal 104 is a Digital Visual Interface (DVI) output signal. In alternative embodiments, digital display output signal 104 may be other display interfaces such as VESA Digital Packet Video Link (DPVL), High Definition Multimedia Interface (HDMI), Unified Display Interface (UDI), DisplayPort, IEEE1394/Firewire™ or others. In another alternative embodiment, digital display output signal 104 may be a bus interface that uses a DMA controller to access a frame buffer. In yet other alternatives, the source of the media signal may be other types of systems that generate images characterized by partially constant image areas.

A characteristic of digital display output signal 104 is that it communicates a stream of pixels representing a digital video image where the receiver is able to determine the two dimensional display address of each received pixel based on the communication protocol. The stream of pixels includes redundant transmission of unchanged pixels that are an exact digital match with previously received pixel data of the same image location.

Digital display signal 104 is received by display signal encoding module 106. Display signal encoding module 106 selects encoding methods and encoding control parameters based on static configuration settings, dynamic image analysis results and/or other externally available data. One example of external data is external bandwidth availability information (reference numeral 108) which includes network statistics as provided by a traffic management system, data processor 102 or other systems. Display signal encoding module 106 transmits encoded display image as packets (contained in signal 110) to remote system 112 across network 114. In the described embodiment, network 114 is an IP-based corporate local area network but the invention is applicable to other communications networks. Remote system 112 is comprised of display signal decoding module 116 also illustrated in FIG. 6 and standard display controller 120 connected to display 124.

Display controller 120 accesses output display images in display signal decoding module 116 (reference numeral 118) and generates video raster signal 122 shown. In the embodiment, video raster signal 122 is a DVI signal but the invention is equally applicable to other digital display interfaces described or analog interfaces such as VGA. Video raster signal 122 signal then drives remote display 124 shown. In the described embodiment, display signal decoding module 116 communicates error status information (logical signal reference numeral 150) with display signal encoding module 106 using network 114. Errors include the late arrival or corruption of received packets as well as the loss of packets altogether.

Figure 2:
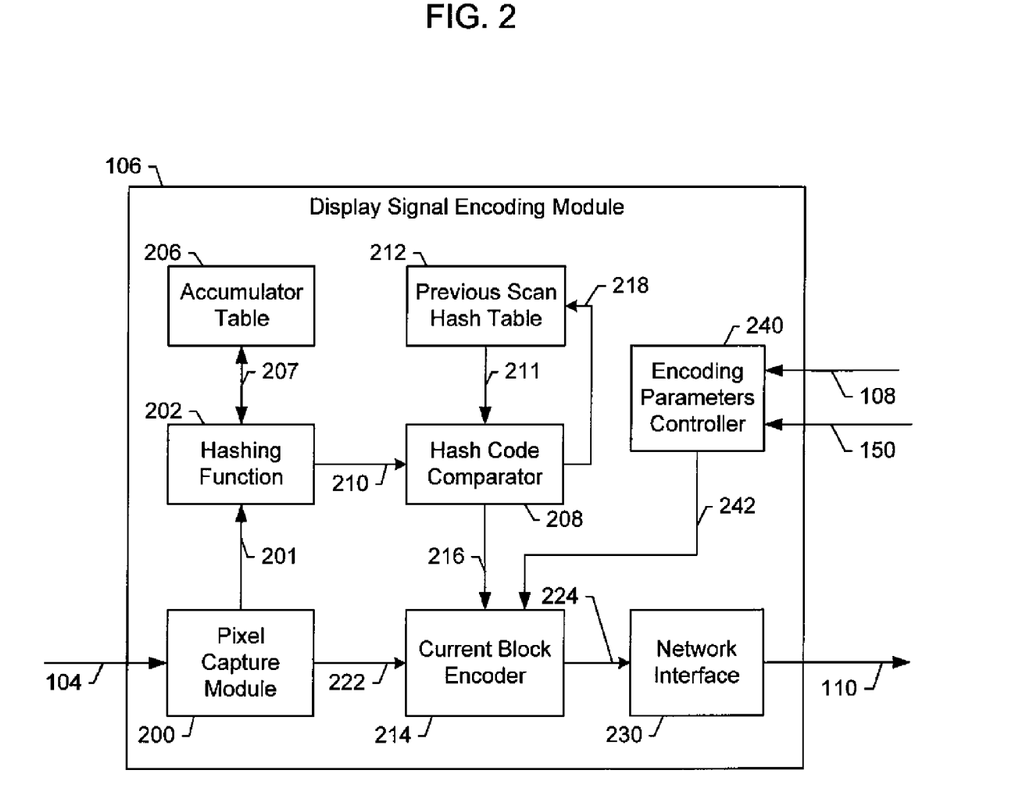
FIG. 2 is a diagram of a display signal encoding module used to detect persistent regions of a display image and encode them into layers of increasing quality for regulated transmission across a network.

FIG. 2 is a diagram of display signal encoding module 106 used to detect persistent regions of a display image and encode them into layers of increasing quality for regulated transmission across network 114. In the embodiment shown, incoming display signal 104 from data processor 102 is received by pixel capture module 200. Pixel capture module 200 forwards the pixels to hashing function 202 and current block encoder 214 using connections 201 and 222, respectively. Hashing function 202 operates in conjunction with accumulator table 206 to calculate hash codes for one or more spatially defined segments of incoming display signal 104. One embodiment operates on square blocks of 8×8 pixels, which are convenient for discrete cosine transformation calculations; however it is also feasible to capture and segment partial lines, single lines, other defined image areas or entire image frames. This specification refers to any one of these object types as a "scan block."

The hashing function calculates a partial hash code for a horizontal raster line sequence of 8 incoming pixels from pixel capture module 200 (i.e. the hashing function is iteratively executed and a new partial value generated as each pixel is received). Starting with the first line in a horizontal scan, a partial hash code is calculated for the first 8 pixels in the line. Once the partial code has been calculated, it is stored in accumulator table 206 (using connection 207 shown) and the hashing function calculates and stores a new partial code for the next 8 pixels in the line. This sequence is repeated until the end of the line of pixels in the scan. When the second scan line is initiated, the partial hash code for the first 8 pixels of the first line is retrieved from accumulator table 206 and the code is updated to include the first 8 pixels in the new line directly below the first line. This sequence is repeated for the rest of the second line and for all 8 lines. Once a hash code has been calculated for an 8×8 scan block of pixels, it is forwarded to hash code comparator 208 as a complete recent scan hash code (contained in reference signal 210 shown). Hash code comparator 208 therefore receives a stream of hash codes corresponding to each row of adjacent 8×8 pixel blocks. Hash codes are then calculated for the second row of blocks in the image and the sequence is repeated following the raster scan down and across the image until the complete image is converted into a series of codes. In one embodiment, hashing function 202 is a Cyclic Redundancy Check (CRC) algorithm that calculates a strong checksum as the hash code. However, an MD5 algorithm, Secure Hash (SHA-1) algorithm or other hashing, fingerprinting or message digest functions are also feasible alternatives. These strong checksum algorithms compute a k-bit code that is essentially unique in the sense that the probability of computing the same code from two different scan blocks is sufficiently small.

When hash code comparator 208 receives a recent scan hash code (reference signal 210), it compares it with a hash code in previous scan hash table 212 representing a scan block at the same location in the previous frame (retrieved using reference signal 211). A persistent scan block is detected if a recent scan hash code is the same as a previous scan hash code (reference signal 211). If the hash codes are different, current block encoder 214 is signaled to initialize the progressive build state for the current scan block (using persistent scan block detection signal 216). The applicable location in previous scan hash table 212 is also updated with the hash code for the recent scan (using update signal reference 218). The described embodiment stores previous scan hash codes sequentially in previous scan hash table 212. This continuous linear addressing structure has a direct mapping to the display stream which means that no separate co-ordinate information needs to be stored. In an alternative embodiment such as DPVL or other embodiment where display signal 104 has a discontinuous address structure, additional addressing mechanisms are required throughout display signal encoding module 106. If recent scan hash code (reference 210) matches previous scan hash code (reference 211), current block encoder 214 is signaled to increase or hold the current progressive build state.

Pixel capture module 200 also forwards incoming digitized display data to current block encoder 214 (reference 222). Current block encoder 214 buffers and encodes scan blocks as described by FIG. 3. Encoded data for the next build is passed from current block encoder 214 to network interface 230 as signal 224. Network interface 230 hosts a standard networking protocol stack (e.g. TCP/IP) and provides a physical interface such as Ethernet to network 114. Network interface 230 performs network-layer encapsulation of the encoded data and transmits the data to remote system 112 (in FIG. 1) as encoded display packets (reference 110 shown).

Encoding parameters controller 240 provides encoding parameters for current block encoder 214 as signal reference 242 shown. In the described embodiment, encoding parameter controller 240 uses external bandwidth information 108, error status information (reference 150) from display signal decoding module 116 (in FIG. 1), and other information to derive a set of encoding parameters. In the embodiment, these parameters are written to an associated set of registers in current block encoder 214 but other methods, including software embodiments are also possible. Some useful encoding parameters are described in Table 1.

TABLE 1

| Encoding Parameter | Description |
| --- | --- |
| External Bandwidth Availability | Provides current and long term network bandwidth information, including maximum bandwidth and current congestion status |
| Restart Override | Enables the system to recover from encoding errors by forcing an initial build state |
| Retransmission Request | Requests the retransmission of previously transmitted state sequence data in the case where data is lost during transmission |
| Image Type Value | Determines the selection of the encoding method. Image type may be preset, user programmable, provided by graphic command hints from data processor 102 or determined by in-line or other image analysis methods |
| Initial Quality Level | Preset or user defined parameter that sets an initial quality level. The quality level may be adjusted by state sequencer 300 based on bandwidth availability. |
| Quality Increment | User configurable parameter used to calculate quality increments. The quality increment may be adjusted by state sequencer 300 based on bandwidth availability |
| Delay Factor | Determines the number of scan blocks in a window associated with a bandwidth analysis |

The described embodiment shows encoding parameters controller 240 as an independent processing module but alternative embodiments where encoding parameters controller 240 is a state machine or an extension to current block encoder 214 are also possible.

Figure 3:
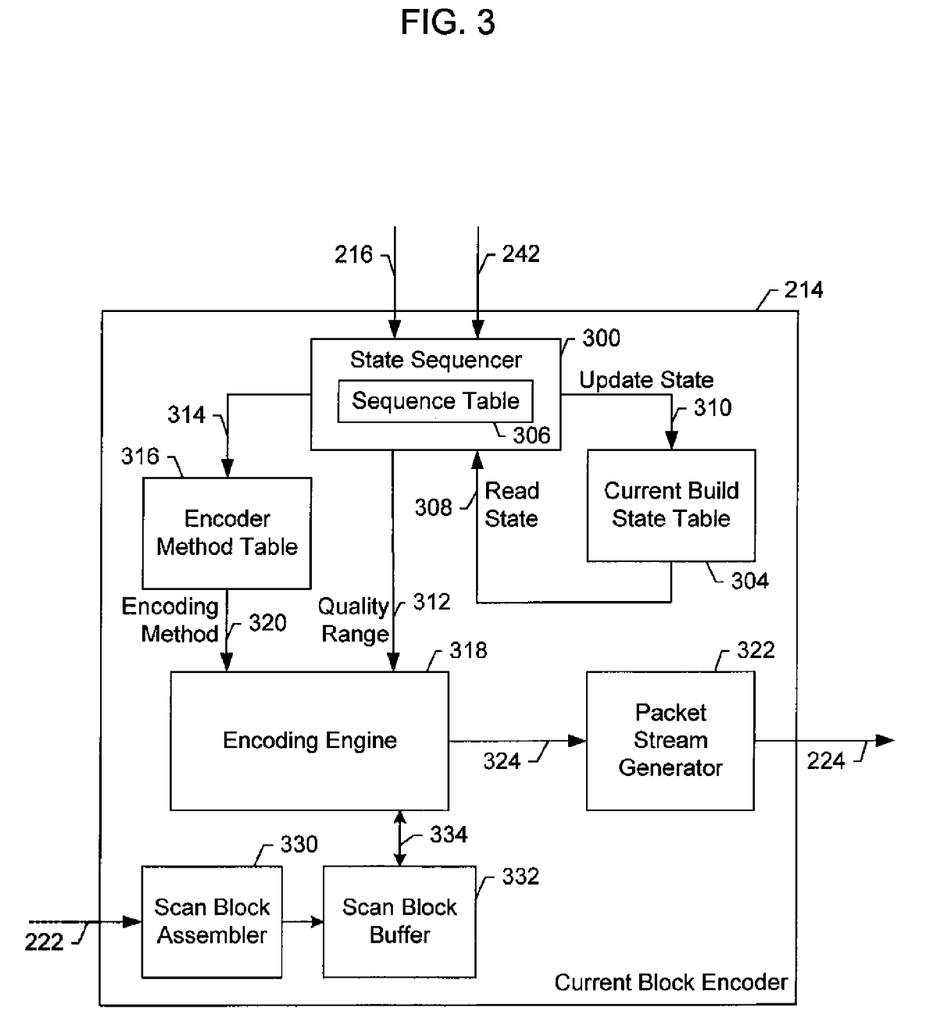
FIG. 3 is a diagram of a current block encoder that produces an encoded build layer based on a selected encoding method, and other input parameters.

FIG. 3 is a diagram of current block encoder 214 that encodes persistent scan blocks into layers of increasing quality. In the embodiment shown, state sequencer 300 controls encoding methods and manages the build states of persistent scan blocks. State sequencer 300 applies a sequencing method to determine the update state for a scan block based on persistent scan block detection signal 216, a current build state for the scan block as stored in build state table 304, knowledge of the sequence used to get to the current state, accumulated build information related to multiple scan blocks and additional encoding parameters 242 described in Table. 1.

In the embodiment shown, scan block assembler 330 assembles pixel stream 222 into scan blocks of 8×8 pixels and stores them in scan block buffer 332. Note that pixel stream 222 associated with a current scan block arrives at current block encoder 214 in advance of persistent scan block detection signal 216 for the scan block hence the requirement to buffer the pixel stream.

In an embodiment, a negation of persistent scan block detection signal 216 signals that a recent scan block in scan block buffer 332 has changed compared with the same scan block in the previous frame and that a new encoding sequence for the recent scan block should be initiated. The selected encoding method for the recent scan block is determined by encoding parameters (reference 242) and the current state of other scan blocks. The available bandwidth is inversely proportional to the number of other scan blocks in active build states. In the embodiment a quality increment is set in proportion to the available bandwidth.

In another embodiment, scan block buffer 332 buffers a window comprising multiple sequential scan blocks before they are encoded while state sequencer 300 simultaneously accumulates persistent block detect information for the same window of scan blocks. This delay of scan blocks in scan block buffer 332 enables state sequencer 300 to procure image statistics over an extended area of a display image before an encoding method and quality range are selected. State sequencer 300 then selects an encoding method and quality range for each delayed recent scan block based on the level of change activity for other scan blocks in the window, effectively allowing the pre-determination of optimum build sequences for each scan block. Scan blocks may be delayed by a single frame, partial frames or multiple frames dependent on memory availability, latency constraints or other factors.

Once an initial encoding method is selected, state sequencer 300 then steps through an associated encoding sequence for each scan block determined by conditional sequence table 306 although other sequencing algorithm implementations such as software sequencers are also possible. An embodiment of an encoding sequence used by state sequencer 300 is provided in FIG. 5. A state sequence diagram and embodiment of sequence table 306 used to derive the shown sequence is presented in FIG. 7.

Entries in current build state table 304 identify the state of each scan block. Each entry is set to an initial state when a new scan block arrives. On each block arrival, an entry is read (reference 308) from the location where the entry for the same block in the previous frame was stored. Once the block is processed and the build state moves to the next state as determined by state sequencer 300, updated build state table entry (reference 310) is also stored in current build state table 304. In the described embodiment, current build state table 304 holds sufficient historic information to enable regeneration of the encoded data in the event of a transmission failure.

Outputs of state sequencer 300 include updated state (reference signal 310) and encoder control directives. The updated state determined by the state sequencer 300 specifies the quality level of the block after the selected encoding is performed. Encoder control directives include a quality range specification (reference signal 312) and an encoding method specification (reference signal 314) which is written to encoder method table 316. Quality range specification 312 determines the quality increment or number of quality levels to be encoded based on encoding parameters (reference 242), and the previous quality level (i.e. where the progressive build data starts from). In an alternative embodiment, specification 312 also provides present bandwidth availability determined in part by the build states of other blocks which may used to schedule the transmission of encoded scan blocks.

Specified encoding method 320 includes specification of the encoding domain and the selection of one or more additional layers for transmission which may be transmitted in any specified domain. In one embodiment, encoding of non overlapping scan blocks predominantly occurs in the discrete cosine transform (DCT) domain, but overlapping scan blocks or the discrete wavelet transforms (DWT) may also be used. Non-transformed encoding methods such as RGB or YCrCb encoding may also be used for part or all of the data. Alternative encoding methods such as spatial sub-sampling methods may also be used. One alternative is a residual encoding method that calculates and transmits a difference value by subtracting a saved copy of the previously decoded image block. Residual encoding is a simpler technique but it is less efficient because at least two bits per pixel must be transmitted and it also requires that current block encoder 214 maintains a copy of the data already transmitted to display signal decoding module 116 (FIG. 1) However, residual encoding serves as an effective final encoding step once a perceptually-lossless quality level has been reached and is a required method in the case where a non-reversible transform is used.

Encoding engine 318 is a selectable quality encoding engine that obtains a specified encoding method from encoding method table 316 (reference signal 320) to process a scan block in scan block buffer 332. In one embodiment, the scan block is transformed into layered bit-planes using standard DCT transform methods. A quality level is then selected by selecting the number of bit planes required to meet the desired quality (as determined by quality range specification 312). Packet stream generator 322 then builds encoded packets for transmission using the designated encoded bit planes (reference 324). In one embodiment, the remaining bit planes are temporarily stored in scan block buffer 332 for future transmission. In an alternative embodiment, all the layers are encoded each time an incoming scan block is assembled. Then, some of the data from the layers is transmitted immediately while the rest of the data is delayed until network bandwidth is available. In another alternative embodiment, encoding engine 318 maintains information about encoded blocks of pixel data to assist the next encoding operation to be performed on the next associated blocks of pixel data. For example encoding engine 318 may save the decoded image data and encoding parameters associated with an image block.

In alternative embodiment of the method described by FIG. 3, image data 222 is encoded as it arrives. The encoded data is then buffered until associated persistent scan block detection signal 216 is available. Then, based on persistent scan block detection signal 222 and other information, a decision is made regarding which part of the encoded data should be selected for transmission. In one example, two initial layers of the encoded image are saved together with two layers of the encoded image representing the next build states as defined by current build state table 304. Then depending on the persistent scan block detection signal and a bandwidth availability (i.e. high bandwidth availability, low bandwidth availability or no availability) the appropriate layers of data are communicated. Since encoded data is compressed, this method may be used to reduce memory storage bandwidth and size.

One benefit of the architecture shown in FIG. 3 is manifested in the efficiency with which reference images may be handled in applications where reference-based encoding is used. A typical MPEG encoder uses a reference image to support encoding but may require multiple processing passes. During a first image analysis pass, the reference image is retrieved from storage and compared against the incoming image for changes. Then, in a second pass, the reference is once again retrieved from memory to facilitate encoding (e.g. motion estimation). This multi-pass processing increases memory bandwidth, cost, interface complexity and power consumption of the system.

In applications that use reference-based encoding, the architecture of the present invention is more efficient. In a first pass, hash codes associated with the new image are compared with historic hash codes which requires minimal memory bandwidth and avoids any requirement for direct reference image access and comparison. In a second encoding pass, the reference image is accessed from memory as necessary but the overall memory bandwidth requirement has been halved.

An alternative to storing the reference image for the final residual encoding is to encode the received persistent image by encoding it and then decoding it to the layer level defined by the information in current build state table 304. This partially decoded image is then used as the reference image for determining the residual. This allows the final residual encoding to be completed without a need for storing a complete reference image.

Figure 4:
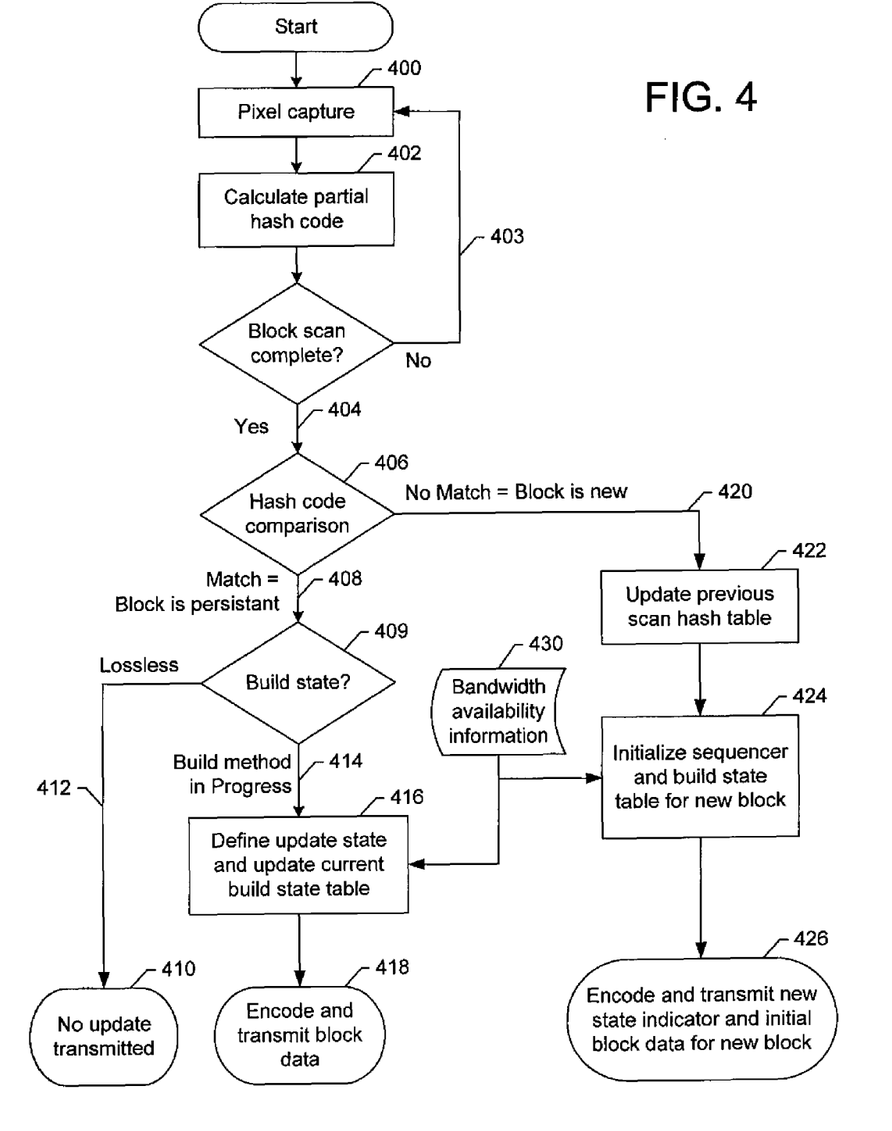
FIG. 4 is a flowchart that shows a persistence test for incoming scan blocks and a build sequence control method used for the encoding and transmission of persistent scan blocks.

FIG. 4 is a flowchart showing an embodiment of a build sequence control method used to encode and transmit persistent scan blocks. Incoming pixels are captured at step 400 which includes the partial assembly of scan blocks by scan block assembler 330 (of FIG. 3). Partial hash codes are calculated 402 as described previously. In case 403, a block scan is incomplete so step 400 is repeated. Pixel capture step 400 also stores pixel data for retrieval during encoding operations 418 or 426.

In case 404, a complete block has arrived. In this case the assembled recent scan block is stored in scan block buffer 332 (in FIG. 3) and the hash code for the recent scan block is compared with that of the hash code for the equivalent scan block in the same position of the previous frame as step 406. In case 408, the scan block is persistent. The build state is checked as a next step 409. In case 414, the persistent scan block has not reached a lossless state so an update is defined (based in part on bandwidth availability information 430). The update results in a new build state that is stored in a current build state table as a next step 416. The scan block data then is encoded using the defined update and transmitted as step 418. In case 412, the block is in a lossless state so no updates are transmitted as step 410. In case 420, hash codes do not match, thus signifying the presence of a new scan block. In this case, the previous scan hash table is updated with the new hash code at step 422. The sequencer and build state for the current block is initialized as step 424, based in part on stored bandwidth availability information 430. As next step 426, the initial data set is encoded and transmitted with an indicator that a new build has been initiated.

Figure 5:
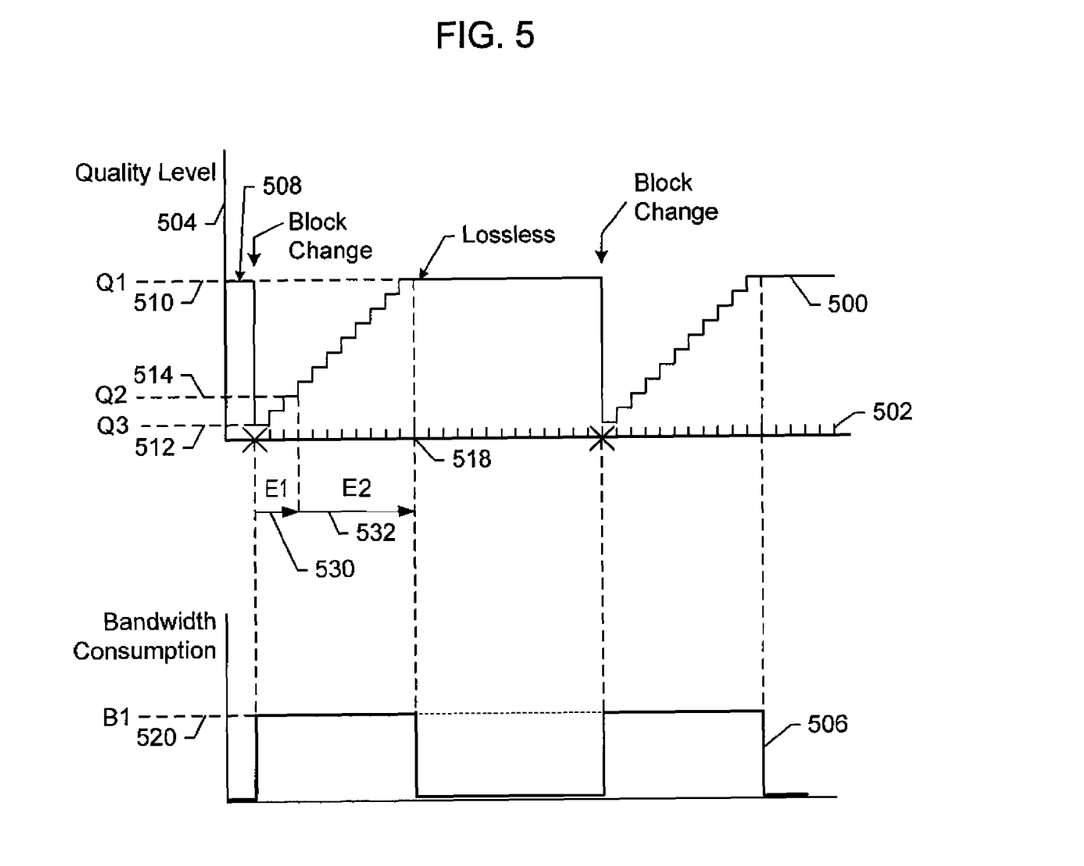
FIG. 5 shows a basic build sequence.

FIG. 5 shows an example embodiment of a basic progressive encoding sequence. The diagram illustrates the use of different encoding methods and the associated bandwidth consumption during the sequenced encoding and transmission of an image block. Plot 500 on the upper set of axes illustrates the change in quality over time for an image location corresponding to a single scan block. Each tick on horizontal time axis 502 represents the presence of a new frame where the block data may be the same as the previous frame or it may be different data. Vertical axis 504 measures increasing image quality, for example as measured using a "percentage of pixel correctness" metric or a signal to noise ratio. Plot 506 on the lower axes illustrates the bandwidth consumption (for example using a bits-per-second metric) necessary to transmit progressive data for the same scan blocks over the same period of time.

Referring to plot 500, an initial lossless build state 508 at lossless quality level Q1 (level 510 shown) is assumed. When a different scan block is received and encoded, the quality of the decoded image drops to level Q3 (level 512 shown). Level Q3 is associated with the display of the first quality level for an initial set of bit planes related to the new image.

In the embodiment shown, transform domain encoding method E1 (reference 530) is used to achieve quality level Q2 (level 514 shown) over a few frames using constant bandwidth B1 (level 520 shown). In the embodiment shown, quality level Q2 represents a perceptually acceptable quality state and is reached well in advance of a lossless image state. At this point, the encoding sequencer may make the decision as to the best method to complete the build sequence. In the embodiment shown, encoding method E2 (reference 532) is used to complete the sequence.

In the embodiment shown, the build sequence is completed using the same encoding methods and consuming the same bandwidth resources B1 (520 shown). E2 uses the same method as E1 in the described embodiment. In an alternative embodiment, a residual method is used to complete the sequence. This may use more bandwidth but is easier to implement. In another alternative, multiple bit planes are transmitted in each step of the sequence. Yet another alternative is to delay the completion of the build sequence based on the persistence of the block, bandwidth availability or how quickly the image needs to be improved. In this case, the bandwidth consumption drops until the build progression is resumed.

The build sequence is completed at time 518 when lossless quality level 510 is once again reached. In an alternative embodiment, the sequencer may build to a lower defined quality level rather than completing the build to a lossless image state. For example the build may be completed to a perceptually lossless state and then held at that state.

Figure 6:
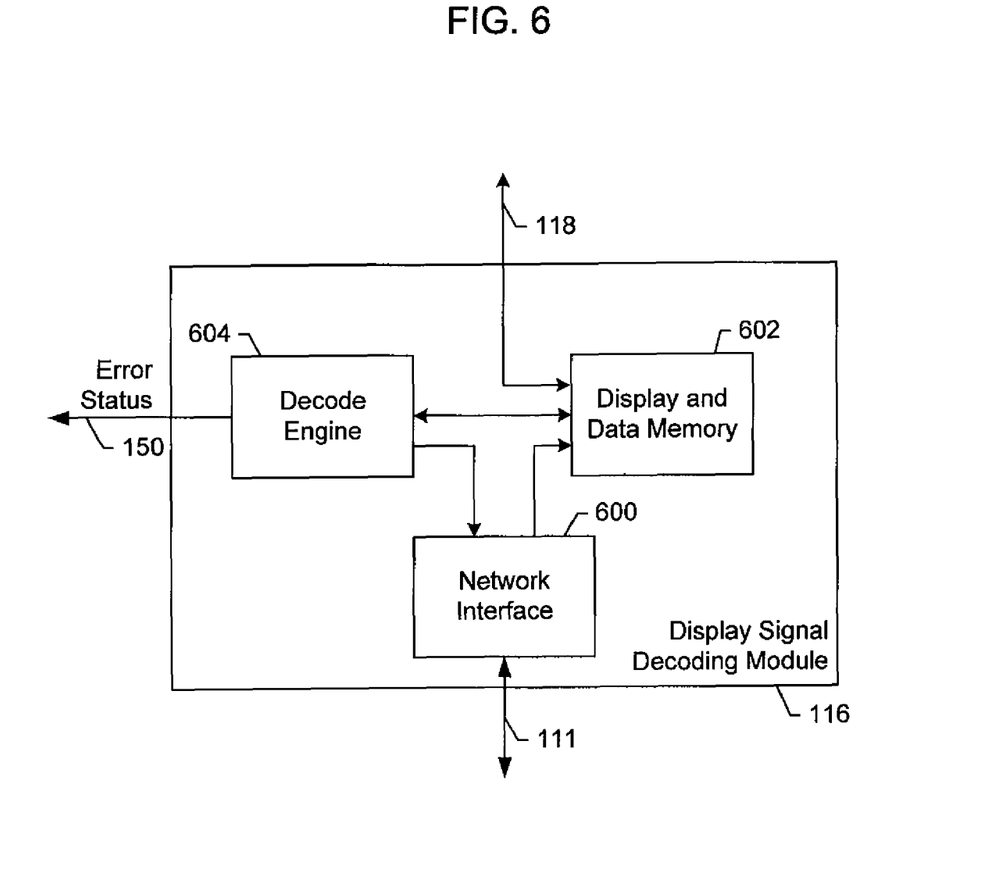
FIG. 6 shows an embodiment of a display signal decoding module.

FIG. 6 shows an embodiment of display signal decoding module 116. Network interface 600 provides a physical, transport and network layer interface between remote system 112 and network 114 (FIG. 1). De-packetized encoded scan block data such as bit planes or other transformed data is temporarily stored in display and data memory 602. Decode engine 604 retrieves the encoded bit planes, transforms the data using standard inverse transform methods (such as Inverse DCT) and progressive build methods. Decode engine 604 updates the output display frame buffer in display and data memory 602 with updated image information. Display controller 120 (FIG. 1) accesses the output display frame buffer in display and data memory 602 and retrieves display frames (as signal reference 118). Decode engine 604 may support lossy or lossless build modes and use multiple domains including spatial, wavelet, RGB and YCrCb domains. Error status information (reference numeral 150) from decode engine 604 is communicated to display signal encoding module 106 (in FIG. 1) using network connection 111.

Figure 7:
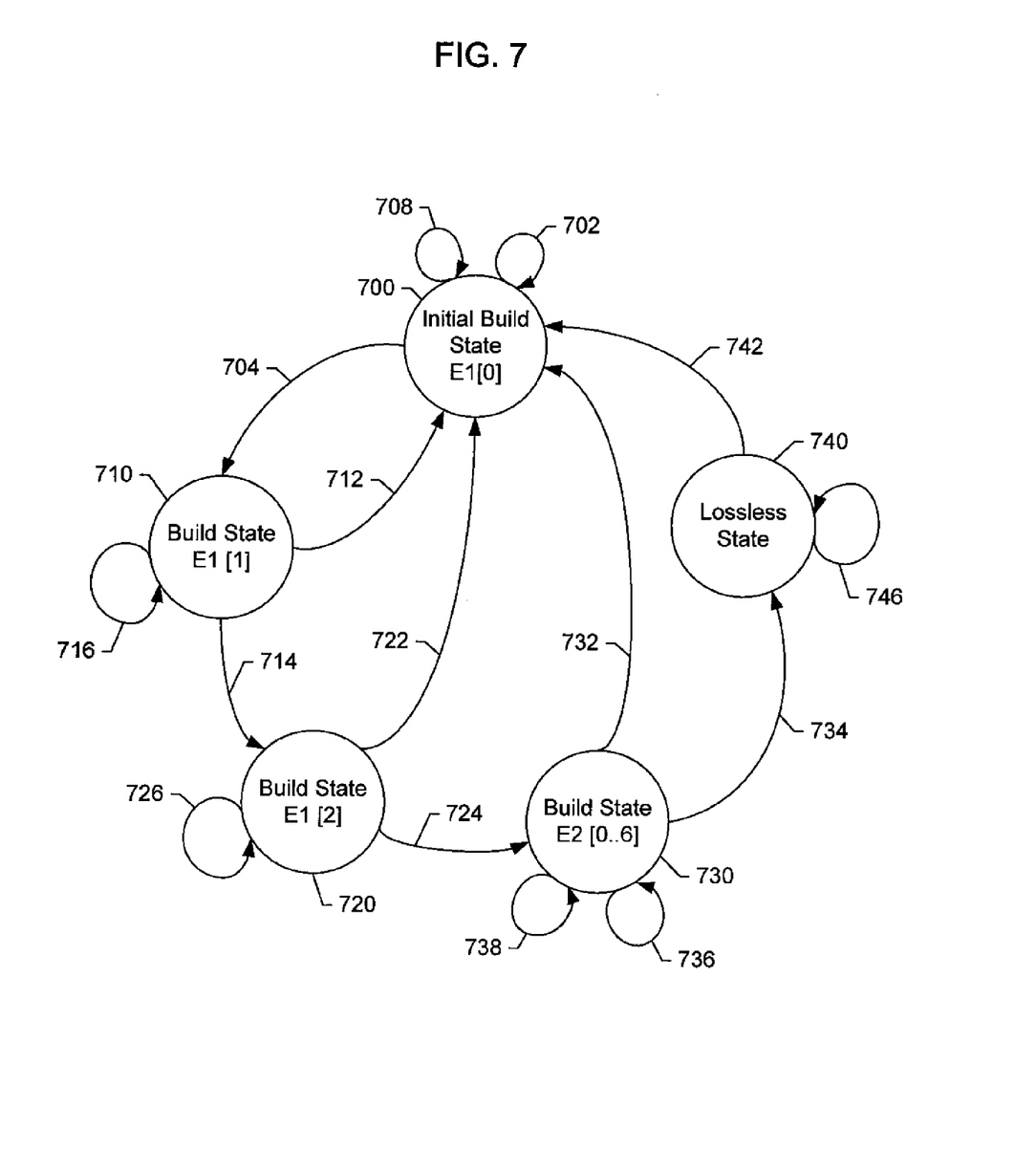
FIG. 7 illustrates a state sequence diagram for a state sequencer using two encoding methods.

FIG. 7 shows a state sequence diagram for an embodiment of state sequencer 300 that uses two encoding methods, as is the case described for the progressive build sequence described by FIG. 5. The system sequences between initial build state E1 [0] (reference 700), build state E1 [1] (reference 710), build state E1 [2] (reference 720), build state E2 (reference 730) and a lossless state 740 (reference 740). Note that in the embodiment, build state E2 is comprised of 7 similar sub-states, namely build state E2 [0.6] in accordance with the 7 steps shown for E2 in FIG. 5 but other embodiments where E1 and E2 have more or fewer build levels are also possible.

In the embodiment, state sequencer 300 analyses the state of each block on a periodic basis. The current state for a block is retrieved from current build state table 304 and a next state, quality range (reference 312) and encoder method (reference 314) are set based on a conditional analysis. Table 2 shows an embodiment of sequence table 306 where state transitions are determined by persistent scan block detection signal 216, available bandwidth and a restart override signal. Note that numerous other embodiments where sequence table 306 includes other encoding parameters or conditions such as those described in Table 1 are also possible.

TABLE 2

| Current State | Condition | Next State | Encoding Method (Ref. 314) | Notes |
|---|---|---|---|---|
| E1 [0] (FIG. 7 Ref. 700) | New Scan Block (FIG. 7 Ref. 702) | E1 [0] (FIG. 7 Ref. 700) | E1 | 1 |
| | Advance State (FIG. 7 Ref. 704) | E1 [1] | E1 | 2 |
| | Hold Current State (FIG. 7 Ref. 708) | E1 [0] (FIG. 7 Ref. 700) | No Encode Quality Range = 0 | 3 |
| E1 [1] (FIG. 7 Ref. 710) | New Scan Block (FIG. 7 Ref. 712) | E1 [0] (FIG. 7 Ref. 700) | E1 | 1 |
| | Advance State (FIG. 7 Ref. 714) | E1 [2] (FIG. 7 Ref. 720) | E1 | 2 |
| | Hold Current State (FIG. 7 Ref. 716) | E1 [1] (FIG. 7 Ref. 710) | No Encode Quality Range = 0 | 3 |
| E1 [2] (FIG. 7 Ref. 720) | New Scan Block (FIG. 7 Ref. 722) | E1 [0] (FIG. 7 Ref. 700) | E1 | 1 |
| | Advance State (FIG. 7 Ref. 724) | E2 [0] (FIG. 7 Ref. 730) | E2 | 2 |
| | Hold Current State (FIG. 7 Ref. 726) | E1 [2] (FIG. 7 Ref. 720) | No Encode Quality Range = 0 | 3 |
| E2 [n] (n < 6) (FIG. 7 Ref. 730) | New Scan Block (FIG. 7 Ref. 732) | E1 [0] (FIG. 7 Ref. 700) | E1 | 1 |
| | Advance State (FIG. 7 Ref. 738) | E2[n + 1] (FIG. 7 Ref. 730) | E2 | 2 |
| | Hold Current State (FIG. 7 Ref. 736) | E2 [n] (FIG. 7 Ref. 730) | No Encode Quality Range = 0 | 3 |
| E2 [6] (FIG. 7 Ref. 730) | New Scan Block (FIG. 7 Ref. 732) | E1 [0] (FIG. 7 Ref. 700) | E1 | 1 |
| | Advance State (FIG. 7 Ref. 734) | Lossless State (FIG. 7 Ref. 740) | E2 | 2, 4 |
| | Hold Current State (FIG. 7 Ref. 736) | E2 [6] (FIG. 7 Ref. 730) | No Encode Quality Range = 0 | 3 |
| Lossless State (FIG. 7 Ref. 740) | New Scan Block (FIG. 7 Ref. 742) | E1 [0] | E1 | 1 |
| | Advance State | Lossless State (FIG. 7 Ref. 746) | No Encode Quality Range = 0 | 2 |
| | Hold Current State | Lossless (FIG. 7 Ref. 746) | No Encode Quality Range = 0 | 3 |
| ANY | Restart Override Signal | E1 [0] (FIG. 7 Ref. 700) | E1 | |

Referring to Table 2, it is to be understood that New Scan Block condition is true when a new scan block is detected and persistent scan block detection signal 216 is negated as described in FIG. 2. Advance State condition is true when sufficient bandwidth is available to support the transmission of the next encoded bit plane. In an embodiment, this is based on external bandwidth availability signal 108. In another embodiment, the update requirements for a window of scan blocks are analyzed and a bandwidth requirement is estimated based on a regional analysis. In the described state sequence embodiment, quality range specification 312 is set to 1 but other embodiments where the quality range is proportional to the available bandwidth are also feasible. Hold Current State condition is true when bandwidth availability (as determined by external bandwidth and/or a regional analysis) is insufficient to support the transmission of the next encoded bit plane. In this case, quality range specification 312 is set to 0. Advance State condition for E2[n] where n is less then 6 results in the using the E2 encoder to select the next bit plane as it progressively improves the image quality on each iteration.

Figure 8:
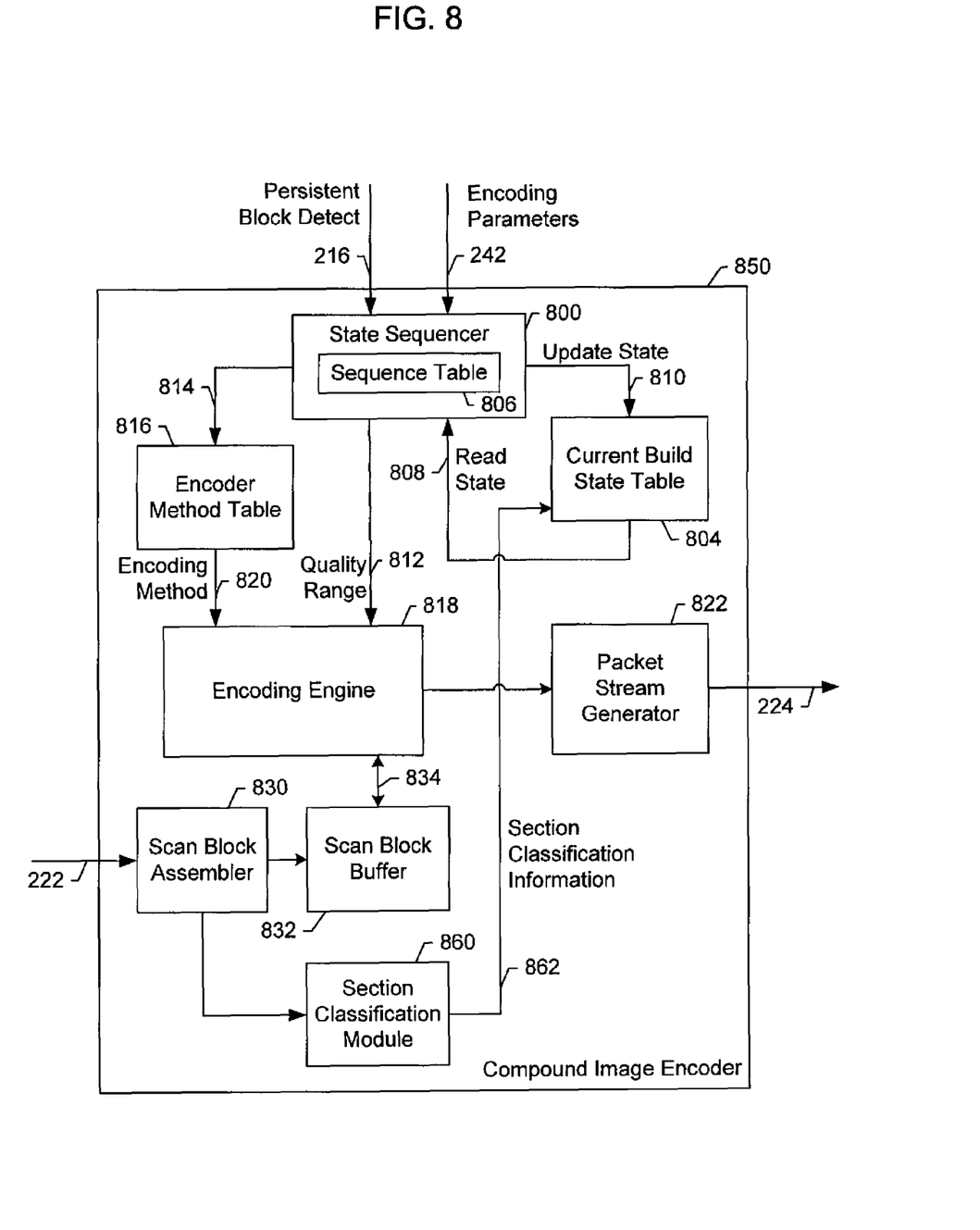
FIG. 8 shows an embodiment of a compound image encoder.

FIG. 8 shows an alternative embodiment of current block encoder 214 detailed in FIG. 3. Compound image encoder 850 shown in FIG. 8 incorporates section classification module 860 which pre-processes recent scan blocks or other defined image regions by identifying image features typical of a compound image including computer display images incorporating background and picture areas overlaid with text and high detail icons.

Section classification module 860 classifies the recent scan block or other specified region by image type as a precursor to image encoding. Different image types such as background, text, picture or object layers based on spatial features such as contrast, color or content are identified using standard image analysis methods or interpreting drawing commands provided by data processor 102. In the embodiment shown, section classification module 860 associates an image type value with each recent scan block and sets a scan block classification entry associated with a scan block in current build state table 804 (using reference signal 862) once it has been classified. In an alternative embodiment, multiple scan blocks in a related area (or related areas) are classified together and granted the same classification. This requires more complex memory management but improves the efficiency and accuracy of classification.

The embodiment shown in FIG. 8 operates in much the same way as current block encoder 214 with the addition of compound image support. In an embodiment, state sequencer 800 controls encoding methods and manages the build state of classified scan blocks. State sequencer 800 applies a sequencing method to determine the update state for each of the scan blocks based on persistent scan block detection signal 216, a current build state for each scan block as stored in build state table 304, knowledge of the sequence used to get to the current state, accumulated information about multiple scan blocks and additional encoding parameters 242 described in Table 1, an initial quality level and optionally other build state parameters as before.

In the embodiment, scan block assembler 830 assembles pixel stream 222 into scan blocks of 8×8 pixels and stores them in scan block buffer 832 as before. Persistent scan block detection signal 216 signals that a recent scan block in scan block buffer 832 is changed from the related scan block in the same position of the previous frame and that a new encoding sequence for the recent scan block should be initiated. The selected encoding method for the recent scan block is determined by encoding parameters (reference 242), the current state of other blocks within a selected scan block window and the classification of the scan block. State sequencer 800 then steps through an encoding sequence for each scan block determined by conditional sequence table 806 although other sequencing algorithm implementations such as software sequencers are also possible.

Entries in current build state table 804 identify the state of each scan block. Each entry is set to an initial state when a new scan block arrives. On each block arrival, an entry (reference 808) is read from the location where the entry for the same block in the previous frame was stored. Once the scan block has been processed and the build state has moved to the next state as determined by state sequencer 800, updated build state table entry (reference 810) is also stored in current build state table 804. In an embodiment, current build state table 804 holds sufficient historic information to enable regeneration of the encoded data in the event of a transmission failure.

Outputs of state sequencer 800 include updated state (reference signal 810) and encoder control directives. The updated state specifies the quality level for the scan block after the selected encoding is performed. Encoder control directives include a quality range specification (reference signal 812) and an encoding method specification (reference signal 814) for the scan block. This information is written to encoder method table 816. Quality range specification 812 determines the quality increment or number of quality levels to be encoded based on encoding parameters (reference 242), the previous quality level (i.e. where the progressive build data starts from), present bandwidth availability determined in part by the build states of other blocks and image type as determined by section classification module 860. In one embodiment, scan blocks classified as text are prioritized by using large quality increments while scan blocks classified as pictures are assigned smaller quality increments and therefore consume a relatively lower proportion of available bandwidth.

Specified encoding method 820 includes specification of the encoding domain for encoding of each scan block and the selection of one or more additional layers for transmission that may be transmitted in any specified domain. In one embodiment, lossless encoding is used for a text layer while DCT encoding is used for a picture layer. Non-transformed encoding methods such as RGB or YCrCb encoding may also be used for part or all of the data. Alternative encoding methods such as spatial sub-sampling methods may be used too. Alternative embodiments described herein and illustrated in FIG. 3 are also applicable. Encoding engine 818 and packet stream generator 822 operate in a similar fashion to encoding engine 318 and packet stream generator 322 described in FIG. 3. While methods and apparatus for encoding a digital video signal have been described and illustrated in detail, it is to be understood that many changes and modifications can be made to various embodiments of the present invention without departing from the spirit thereof.

What is claimed is:

1. A method for transmitting an update to an image, the method executed under the control of a processor configured with computer executable instructions, the method comprising:
   a) determining, by a host system having one or more processors, a state of a section of the image as being unchanged from a previous transmission of a previous encoding of the section,
   b) in response to the state being unchanged, identifying, by the host system having the one or more processors, a requirement for transmitting an update encoding of the section;
   c) determining, by the host system having the one or more processors, an availability of network bandwidth to transmit the update encoding of the section; and
   d) responsive to the requirement to transmit and the availability of network bandwidth, transmitting, by the host system having the one or more processors, the update encoding of the section.

2. The method of claim 1 wherein the section comprises a scan block comprising pixel data.

3. The method of claim 1 wherein the image comprises a time sequence of a previous image frame and a current image frame, and determining the state being unchanged comprises:
   calculating a current hash code from current pixel data of a section of the current image frame; and
   comparing the current hash code to a previous hash code, the previous hash code associated using pixel data from the section of the previous image frame.

4. The method of claim 1 wherein identifying the requirement for transmitting the update encoding comprises determining that a previous encoding of the section is transmitted less than a lossless quality or at less than a defined quality.

5. The method of claim 1 wherein transmitting the update encoding of the section comprises transmitting at least one additional encoding associated with the section and a current build state.

6. The method of claim 5 wherein the at least one additional encoding comprises a quality increment, the quality increment comprising at least one transformed bit plane.

7. The method of claim 5 wherein the at least one additional encoding is associated with current build states of other sections of the image.

8. The method of claim 5, wherein the at least one additional encoding is responsive to a second update encoding of at least one other section.

9. The method of claim 1, wherein transmitting the update encoding of the section comprises encoding the section according to the availability of network bandwidth.

10. The method of claim 1, wherein the transmitting the update encoding of the section comprises determining a bandwidth requirement for a region of the image.

11. The method claim of 1, wherein the image comprises a plurality of sections.

12. The method of claim 11, wherein each section of the plurality of sections comprises an independent state.

13. The method of claim 1, further comprising obtaining the section from a raster video signal.

14. The method claim of 1, wherein the image comprises a computer display image.

15. The method of claim 1 further comprising repeating steps a), b), c) and d) until an update to the image is transmitted.

16. The method of claim 1 further comprising:
   e) if the state identifies the section as being changed, identifying a requirement to transmit an update encoding of the section comprising an initial quality encoding of the section.

17. A method for transmitting an image, the method executed under the control of a processor configured with computer executable instructions, the method comprising:
   determining, by a host system having one or more processors, a requirement to transmit an encoding of a scan block in response to the scan block having changed from a previous transmission of a previous encoding of the scan block, the scan block comprising a plurality of pixels of the image, the scan block being one of a plurality of scan blocks of the image;
   determining, by the host system having the one or more processors, an availability of bandwidth to transmit the encoding of the scan block; and
   responsive to the requirement to transmit and the availability of network bandwidth, transmitting, by the host system having the one or more processors, the encoding of the scan block.

18. The method of claim 17 wherein the plurality of scan blocks of the image comprise at least one changed scan block and at least one unchanged scan block.

19. The method of claim 18 wherein the availability of bandwidth is associated with the quantity of changed scan blocks.

20. The method of claim 17 wherein the bandwidth to transmit comprises at least one of network bandwidth, memory bandwidth or processing bandwidth.

21. The method of claim 17 further comprising determining the scan block being changed comprises:
   calculating a current hash code from current pixel data of the scan block; and
   comparing the current hash code to a previous hash code, the previous hash code associated with previous pixel data from the scan block.

22. The method of claim 17 wherein the transmitting the encoding of the scan block comprises encoding at least one layer of quality of current pixel data of the scan block.

23. The method of claim 22 wherein the encoding at least one layer of quality of current pixel data comprises encoding the current pixel data to a defined quality level.

24. The method of claim 23 wherein the encoding the at least one layer of quality of current pixel data comprises encoding according to current build states for other scan blocks from the image.

25. The method of claim 23, wherein the encoding the at least one layer of quality of the current pixel data is responsive to a state change of at least one other scan block.

26. The method of claim 23, wherein the encoding the at least one layer of quality of current pixel data comprises encoding according to the availability of network bandwidth.

27. The method of claim 23, wherein the encoding at least one layer of quality of the current pixel data comprises determining a bandwidth requirement for a region of the image.

28. The method of claim 17 wherein the transmitting the encoding of the scan block comprises updating a current build state of the scan block in association with the encoding of the scan block.

* * * * *